United States Patent [19]
Wright

[11] 3,944,898
[45] Mar. 16, 1976

[54] CONTROL CIRCUITS FOR ELECTRICALLY DRIVEN VEHICLES

[75] Inventor: Maurice James Wright, Birmingham, England

[73] Assignee: Joseph Lucas (Industries) Limited, Birmingham, England

[22] Filed: June 14, 1974

[21] Appl. No.: 479,532

[30] Foreign Application Priority Data
June 30, 1973 United Kingdom............... 31298/73

[52] U.S. Cl.................................. 318/258; 318/376
[51] Int. Cl.² ........................................... H02P 3/12
[58] Field of Search ........... 318/139, 258, 269, 373, 318/376

[56] References Cited
UNITED STATES PATENTS
| | | | |
|---|---|---|---|
| 3,504,257 | 3/1970 | Smith | 318/258 X |
| 3,566,227 | 2/1971 | Edhlund | 318/258 |

Primary Examiner—Gene Z. Rubinson
Attorney, Agent, or Firm—Holman & Stern

[57] ABSTRACT

A control circuit for an electrically driven vehicles has a traction motor the armature of which can be connected between positive and negative supplies lines in either sense to drive the vehicle in either direction. Also, the armature is connected through a diode to one of the supply lines to permit electrical braking.

1 Claim, 1 Drawing Figure

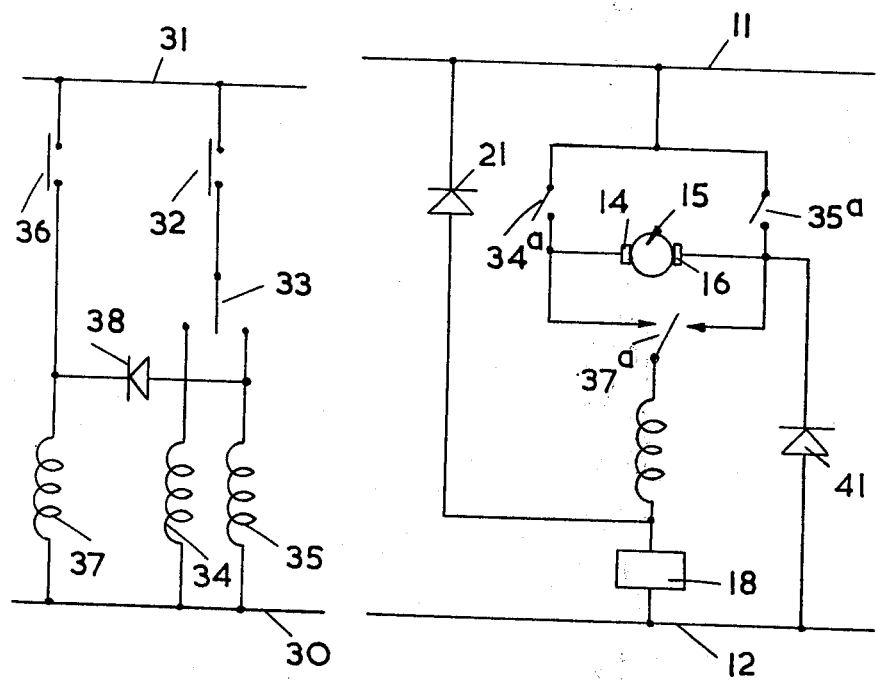

CONTROL CIRCUITS FOR ELECTRICALLY DRIVEN VEHICLES

This invention relates to control circuits for electrically driven vehicles.

A control circuit according to the invention comprises in combination positive and negative supply lines for connection to a traction battery on the vehicle, a traction motor, a first contactor which when closed connects one side of the motor armature to the positive supply line, a second contactor which when closed connects the other side of the motor to the positive supply line, a two-position contact having first and second positions in which its connects said one and said other sides of the motor to the negative supply line respectively, a diode through the cathode-anode path of which said other side of the motor is coupled to the negative supply line, and means whereby when it is desired to drive the vehicle forwardly the first and second contactors are closed and opened respectively and said contact is in its second position, but when it is desired to drive the vehicle rearwardly, the first and second contactors are opened and closed respectively and the contact is in the said first position, and when it is desired to brake the vehicle electrically while it is being driven forwardly the first and second contactors are open and the contact is in said first position.

The accompanying drawing is a circuit diagram illustrating one example of the invention.

Referring to the drawing, a road vehicle has a 24 volt battery supplying power to positive and negative supply lines 31, 30, and a traction battery providing power to positive and negative supply lines 11, 12. The vehicle includes a selector switch 33 for selecting forward or reverse movement of the vehicle, the movable contact of the switch 33 being connected to the line 31 through a normally open switch 32 which is closed when the accelerator pedal of the vehicle is depressed. In its forward and reverse positions, the switch 33 permits energisation of relay windings 34 and 35 respectively. The brake pedal of the vehicle serves when depressed to close a switch 36, connected in series with a relay winding 37 between the lines 31, 30, and when the winding 35 is energised, the winding 37 is also energised by way of a diode 38.

The vehicle is driven by a traction motor having an armature 15 and a field winding 17. One side 14 of the armature 15 is connected to the line 11 through a normally open contact 34a and the other side 16 of the armature 15 is connected to the line 11 through a normally open contact 35a, the contacts 34a and 35a being operated by the windings 34 and 35 respectively. When the winding 37 is not energised, a contact 37a controlled by the winding 37 connects the side 16 of the armature to the line 12 through the field winding 17 and a thyristor chopper circuit 18 of any convenient known form. When the winding 37 is energised, the contact 37a moves to a position in which it connects the side 14 to the line 12 through the winding 17 and chopper circuit 18. The junction of the winding 17 and chopper circuit 18 is connected to the line 11 through a freewheel diode 21, and the side 16 of the motor is connected to the line 12 through the cathode-anode path of a diode 41.

If the driver of the vehicle wishes to move forwardly, he moves the switch 33 to a position to energise the winding 34 once the accelerator pedal is depressed. The side 14 of the motor is connected to the line 11, and the other side is connected to the line 12 and the motor operates in the required manner. For reverse movement, the winding 35 will be energised and so will the winding 37. The side 16 of the motor will now be connected to the line 11 and the side 14 will be connected to the line 12 by way of the contact 37a.

If electrical braking is required while the vehicle is being driven forwardly, the switch 36 is closed and the winding 37 alone is energised. The motor now acts as a generator to charge the battery through the diodes 41 and 21.

Whenever the motor is operating, the current flowing through its armature is controlled by the chopper circuit 18. When the accelerator pedal is depressed, the current is set by means associated with the accelerator pedal, but when the brake pedal is depressed it controls the mean current flow in the armature.

I claim:

1. A control circuit for an electrically driven vehicle, comprising in combination positive and negative supply lines for connection to a traction battery on the vehicle, a traction motor, a first contactor which when closed connects one side of the motor armature to the positive supply line, a second contactor which when closed connects the other side of the motor to the positive supply line, a series connection of a field winding and a chopper circuit, a two-position contact having first and second positions in which it connects said one and said other sides of the motor to the negative supply line respectively through said field winding and chopper circuit, a diode through the cathode-anode path of which said other side of the motor is coupled to the negative supply line, a second diode coupling the junction between said field winding and chopper circuit to said positive supply line, and means whereby when it is desired to drive the vehicle forwardly the first and second contactors are closed and opened respectively and said contact is in its second position, but when it is desired to drive the vehicle rearwardly, the first and second contactors are opened and closed respectively and the contact is in said first position, and when it is desired to brake the vehicle electrically while it is being driven forwardly the first and second contactors are open and the contact is in said first position.

* * * * *